US012062472B2

(12) United States Patent
Liao et al.

(10) Patent No.: US 12,062,472 B2
(45) Date of Patent: Aug. 13, 2024

(54) NEODYMIUM-IRON-BORON MAGNETIC BODY HAVING GRADIENT DISTRIBUTION AND PREPARATION METHOD THEREOF

(71) Applicant: JL MAG RARE EARTH CO., LTD., Ganzhou (CN)

(72) Inventors: Minghuo Liao, Ganzhou (CN); Baogui Cai, Ganzhou (CN); Yong Liu, Ganzhou (CN); Haiming Wu, Ganzhou (CN)

(73) Assignee: JL MAG RARE EARTH CO., LTD., Ganzhou (CN)

( * ) Notice: Subject to any disclaimer, the term of this patent is extended or adjusted under 35 U.S.C. 154(b) by 211 days.

(21) Appl. No.: 17/434,685

(22) PCT Filed: Aug. 24, 2020

(86) PCT No.: PCT/CN2020/110787
§ 371 (c)(1),
(2) Date: Aug. 27, 2021

(87) PCT Pub. No.: WO2022/016647
PCT Pub. Date: Jan. 27, 2022

(65) Prior Publication Data

US 2022/0328219 A1 Oct. 13, 2022

(30) Foreign Application Priority Data

Jul. 20, 2020 (CN) ......................... 202010698191.9

(51) Int. Cl.
*H01F 1/057* (2006.01)
*H01F 41/02* (2006.01)

(52) U.S. Cl.
CPC ....... *H01F 1/0571* (2013.01); *H01F 41/0293* (2013.01)

(58) Field of Classification Search
None
See application file for complete search history.

(56) References Cited

U.S. PATENT DOCUMENTS

| | | | |
|---|---|---|---|
| 2006/0213582 A1 | 9/2006 | Nakamura et al. |
| 2010/0007232 A1 | 1/2010 | Komuro et al. |

(Continued)

FOREIGN PATENT DOCUMENTS

| | | | |
|---|---|---|---|
| CN | 1838344 A | 9/2006 |
| CN | 107017072 A | 8/2017 |

(Continued)

OTHER PUBLICATIONS

Office Action for corresponding JP Application No. 2021-551615 dated Oct. 25, 2022.

(Continued)

*Primary Examiner* — Xiaowei Su
(74) *Attorney, Agent, or Firm* — Honigman LLP; Matthew H. Szalach

(57) ABSTRACT

The present disclosure provides neodymium-iron-boron magnetic body having gradient distribution, comprising an ease-to-demagnetize zone and a hard-to-demagnetize zone, wherein in a direction perpendicular to magnetization direction, remanence of the ease-to-demagnetize zone is less than remanence of the hard-to-demagnetize zone, and coercivity of the ease-to-demagnetize zone is greater than coercivity of the hard-to-demagnetize zone; and along the direction perpendicular to magnetization direction, the remanence and the coercivity of the ease-to-demagnetize zone are respectively a constant value, and the remanence and the coercivity of the hard-to-demagnetize zone are respectively a constant value. Due to the gradient distribution of remanence and coercivity of the neodymium-iron-boron magnetic body provided by the present application, the remanence, coerci- (Continued)

vity, magnetic flux and surface magnetic field of the neodymium-iron-boron magnetic body are optimized.

4 Claims, 2 Drawing Sheets

(56) References Cited

U.S. PATENT DOCUMENTS

| | | | |
|---|---|---|---|
| 2011/0210810 A1 | 9/2011 | Miyata et al. | |
| 2013/0040050 A1 | 2/2013 | Itatani et al. | |
| 2016/0300649 A1 | 10/2016 | Sagawa et al. | |
| 2017/0076846 A1 | 3/2017 | Tsukamoto et al. | |
| 2019/0115128 A1 | 4/2019 | Cui et al. | |
| 2020/0005996 A1* | 1/2020 | Yang | H01F 1/0577 |

FOREIGN PATENT DOCUMENTS

| | | |
|---|---|---|
| CN | 107424698 A | 12/2017 |
| CN | 108899190 A | 11/2018 |
| CN | 108922709 A | 11/2018 |
| JP | 2010022147 A | 1/2010 |
| JP | 2011233663 A | 11/2011 |
| JP | 2017055074 A | 3/2017 |
| JP | 2020004969 A | 1/2020 |
| WO | WO-2010064578 A1 | 6/2010 |
| WO | WO-2014148353 A1 | 9/2014 |

OTHER PUBLICATIONS

International Search Report for Application No. PCT/CN2020/110787 dated Mar. 17, 2021.

"Recoil curve properties and coercive force decrease ratio in NdFeB sintered magnets", Journal of Magnetism and Magnetic Materials—Apr. 2013, Author Yutaka Matsuura et al.

"Influence of Oxygen on Dysprosium Gradient in Grain Boundary Diffusion Processed NdFeB Magnet", Journal of the Chinese Society of Rare Earths, vol. 37, No. 2, Apr. 2019.

Thompson et al.: "Grain-Boundary-Diffused Magnets: The challenges in obtaining reliable and representative BH curves for electromagnetic motor design", IEEE Electrification Magazine, vol. 5, No. 1, Mar. 1, 2017 (Mar. 1, 2017), pp. 19-27, XP011642360, ISSN: 2325-5897, DOI: 10.1109/MELE.2016.2644561.

European Patent Office, Extended European Search Report for Correspondending EP Application No. 20920749.7 mailed May 9, 2022.

* cited by examiner

NEODYMIUM-IRON-BORON MAGNETIC BODY HAVING GRADIENT DISTRIBUTION AND PREPARATION METHOD THEREOF

This application is the national phase of International Application No. PCT/CN2020/110787, titled "NEODYMIUM-IRON-BORON MAGNETIC BODY HAVING GRADIENT DISTRIBUTION AND PREPARATION METHOD THEREOF", filed on Aug. 24, 2020, which claims priority to Chinese Patent Application No. 202010698191.9, titled "NEODYMIUM-IRON-BORON MAGNETIC BODY HAVING GRADIENT DISTRIBUTION AND PREPARATION METHOD THEREOF", filed on Jul. 20, 2020 with the China National Intellectual Property Administration, the disclosures of which are hereby incorporated by reference in their entireties.

FIELD

The present disclosure relates to the technical field of magnetic material, and specifically relates to a neodymium-iron-boron magnetic body having gradient distribution and preparation method thereof.

BACKGROUND

Currently, magnetic materials include but are not limited to sintered neodymium-iron-boron, bonded neodymium-iron-boron, sintered samarium-cobalt, bonded samarium-cobalt, sintered ferrite and bonded ferrite. Although each kind of these magnetic materials has difference in their performances, each part of each magnet almost has the same performance and composition, and even they would show small difference, that might be a result from process defects.

If a magnet shows a big difference in magnetic properties among its different parts, then the magnet must be a defective product resulting from serious quality problems during its production process, which means that magnets currently in actual use do not have a gradient distribution of magnetic properties. However, in the actual use of a magnet, there are different requirements for magnetic properties in each part of the magnet. For example, in the open circuit state, the coercivity of the sintered neodymium-iron-boron decreases as the temperature increases. When a round sintered neodymium-iron-boron magnet rises to a certain temperature, the surface magnetic field and magnetic flux of the sintered neodymium-iron-boron magnetic body will begin to attenuate. The magnetic performance attenuation of the sintered neodymium-iron-boron magnetic body will begin from its center part, because for a round magnetic body, the PC value of the center part is lower than the PC value of edge. That is to say, in an open circuit state of the round sintered neodymium-iron-boron magnetic body mentioned above, if the surface magnetic field and the magnetic flux are maintained to be not attenuated in a predetermined high temperature state, the center part will need a higher coercivity, whereas its edge will not need a coercivity as high as the center part. Therefore, in order to keep such round sintered neodymium-iron-boron magnetic body in open circuit state away from attenuation in a predetermined temperature, the only way is to make each part of this magnet has the same coercivity as that required for the center part. But, doing so will result in a waste of the coercivity in edge of this sintered neodymium-iron-boron magnetic body, and such waste of coercivity also hinder increment of remanence and cost reduction, since in the production process of sintered neodymium-iron-boron, three of coercivity, remanence and cost are in a mutually restrictive relationship. Such phenomenon also exists in magnetic materials such as samarium cobalt and ferrite.

Neodymium-iron-boron magnetic bodies are mainly applied in electric motors. When coils in an electric motor are power on, it generates a backing field which is not a uniform magnetic field, and thus the part of a magnetic body closest to coils is most easily demagnetized, called as a most easily demagnetized zone (easiest-to-demagnetize zone); the part of a magnetic body furthest away from coils is least easily demagnetized, called as a hardly demagnetized zone (hard-to-demagnetize zone); and the zone between the most easily demagnetized zone and the least easily demagnetized zone is a transition zone, called as a easily demagnetized zone (ease-to-demagnetize zone). In a neodymium-iron-boron magnetic body, due to the problem raised by the characteristics of each of the easiest-to-demagnetize zone, the ease-to-demagnetize zone and the hard-to-demagnetize, coercivity of each of zones needs to match with each other, so as to ensure the coercivity of the easiest-to-demagnetize zone and ease-to-demagnetize zone, while the hard-to-demagnetize zone does not show attenuation of surface magnetic field and magnetic flux, and remanence of the ease-to-demagnetize zone and the hard-to-demagnetize zone is the highest.

In order to solve the problem mentioned above, those skilled in the art have proposed a neodymium-iron-boron magnetic body having gradient distribution. Although the neodymium-iron-boron magnetic body has achieved a gradient distribution of performance, a neodymium-iron-boron magnetic body, during its operation, needs to withstand not only a demagnetizing field of the magnetic circuit but also the demagnetization caused by temperature rise. In the magnetic circuit, the demagnetization of a magnetic body starts from edges and corners, whereas the demagnetization caused by operation temperature rise starts from the center part. Therefore, the neodymium-iron-boron magnetic body mentioned above was made without consideration of magnetic reducing of the center part at high temperature.

SUMMARY

The technical problem solved by the present disclosure is to provide a neodymium-iron-boron magnetic body having gradient distribution.

In view of that, this application provides a neodymium-iron-boron magnetic body having gradient distribution of magnetic performance, comprising an ease-to-demagnetize zone and a hard-to-demagnetize zone, wherein in a direction perpendicular to magnetization direction, remanence of the ease-to-demagnetize zone is less than remanence of the hard-to-demagnetize zone, and coercivity of the ease-to-demagnetize zone is greater than coercivity of the hard-to-demagnetize zone; and along the direction perpendicular to magnetization direction, the remanence and the coercivity of the ease-to-demagnetize zone are respectively a constant value, and the remanence and the coercivity of the hard-to-demagnetize zone are respectively a constant value.

Preferably, the neodymium-iron-boron magnetic body further comprises an easiest-to-demagnetize zone, wherein in the direction perpendicular to magnetization direction, remanence of the easiest-to-demagnetize zone is less than the remanence of the ease-to-demagnetize zone, and coercivity of the easiest-to-demagnetize zone is greater than the coercivity of the ease-to-demagnetize zone, and along the direction perpendicular to magnetization direction, the remanence and the coercivity of the easiest-to-demagnetize zone are respectively a constant value.

Preferably, the remanence of the ease-to-demagnetize zone decreases by 0.05 KGs-0.4 KGs relative to the remanence of the hard-to-demagnetize zone, and the coercivity of the ease-to-demagnetize zone increases by 2 KOe-10 KOe relative to the coercivity of the hard-to-demagnetize zone.

Preferably, the remanence of the ease-to-demagnetize zone decreases by 0.05 KGs-0.4 KGs relative to the remanence of the easiest-to-demagnetize zone, and the coercivity of the ease-to-demagnetize zone increases by 2 KOe-10 KOe relative to the coercivity of the easiest-to-demagnetize zone.

This application further provides a preparation method of the neodymium-iron-boron magnetic body having gradient distribution, comprising the following steps:

A) in a direction perpendicular to magnetization direction, coating a first mixture containing a heavy rare earth powder and a solvent on a surface of the ease-to-demagnetize zone in the neodymium-iron-boron magnetic body, and coating a second mixture containing a heavy rare earth powder and a solvent on a surface of the hard-to-demagnetize zone in the neodymium-iron-boron magnetic body, with a mass of the heavy rare earth powder in the first mixture being higher than a mass of the heavy rare earth powder in the second mixture; and B) subjecting a neodymium-iron-boron magnetic body material obtained by step A) to a grain boundary diffusion treatment, and then to an aging treatment after being cooled, to obtain a neodymium-iron-boron magnetic body having gradient distribution.

Preferably, in step A), the method further comprises coating a third mixture containing a heavy rare earth powder and a solvent on a surface of the easiest-to-demagnetize zone in the neodymium-iron-boron magnetic body, with a mass of the heavy rare earth powder in the third mixture being greater than the mass of the heavy rare earth powder in the first mixture.

Preferably, the mass of the heavy rare earth powder in the third mixture is 0.6-1.2 wt % of a mass of the easiest-to-demagnetize zone in the neodymium-iron-boron magnetic body, the mass of the heavy rare earth powder in the first mixture is 0.4-0.7 wt % of a mass of the ease-to-demagnetize zone in the neodymium-iron-boron magnetic body, and the mass of the heavy rare earth powder in the second mixture is 0.05-0.3 wt % of a mass of the hard-to-demagnetize zone in the neodymium-iron-boron magnetic body.

Preferably, the heavy rare earth powder in the first mixture, the heavy rare earth powder in the second mixture and the heavy rare earth powder in the third mixture are one or two independently selected from terbium powder, terbium fluoride powder, terbium alloy powder, dysprosium powder, dysprosium fluoride powder and dysprosium alloy powder; the heavy rare earth powder has a mean particle size of 1-100 μm; the solvent in the first mixture, the solvent in the second mixture and the solvent in the third mixture are silicone oil; and a mass ratio of the heavy rare earth powder to the solvent in the first mixture, a mass ratio of the heavy rare earth powder to the solvent in the second mixture, and a mass ratio of the heavy rare earth powder to the solvent in the third mixture are (90-98):(2-10).

Preferably, the grain boundary diffusion treatment is specifically performed by: firstly maintaining the neodymium-iron-boron magnetic body material at a temperature of 300-500° C. in a vacuum infiltration furnace for 3-5 h to dry and remove the silicone oil, and then heating at a temperature of 700-1000° C. and maintaining for 1-100 h.

Preferably, the aging treatment is performed at a temperature of 400-600° C. for 4-6 h.

This application provides a neodymium-iron-boron magnetic body having gradient distribution, comprising an ease-to-demagnetize zone and a hard-to-demagnetize zone, wherein in a direction perpendicular to magnetization direction, remanence of the ease-to-demagnetize zone is less than remanence of the hard-to-demagnetize zone, and coercivity of the ease-to-demagnetize zone is greater than coercivity of the hard-to-demagnetize zone; and along the direction perpendicular to magnetization direction, the remanence and the coercivity of the ease-to-demagnetize zone are respectively a constant value, and the remanence and the coercivity of the hard-to-demagnetize zone are respectively a constant value. This application provides a neodymium-iron-boron magnetic body having a gradient distribution of coercivity and a gradient distribution of remanence, so as to ensure that the coercivity of the hard-to-demagnetize zone is not too low, and avoid problems of the weak magnetic phenomenon in the hard-to-demagnetize zone or attenuation of magnetic performance at high temperature in the hard-to-demagnetize zone in this kind of high-performance magnetic body, and further ensure the surface magnetic field and magnetic flux of the magnetic body.

Furthermore, this application further provides a preparation method of the neodymium-iron-boron magnetic body. During the preparation process, the trace diffusion of the heavy rare earth in the hard-to-demagnetize zone ensures that the remanence of the hard-to-demagnetize zone does not decrease, while the coercivity thereof matches with the coercivity of the ease-to-demagnetize zone. This not only reduces the decrease of remanence caused by uniform coating of the two permeable surfaces, but also ensures that the coercivity of the hard-to-demagnetize zone is not too low, and avoids the occurrence of the weak magnetic phenomenon in the hard-to-demagnetize zone or attenuation of magnetic properties at high temperature in the hard-to-demagnetize zone, so that a neodymium-iron-boron magnetic body with high-performance can be prepared.

DETAILED DESCRIPTION

Figure 1:
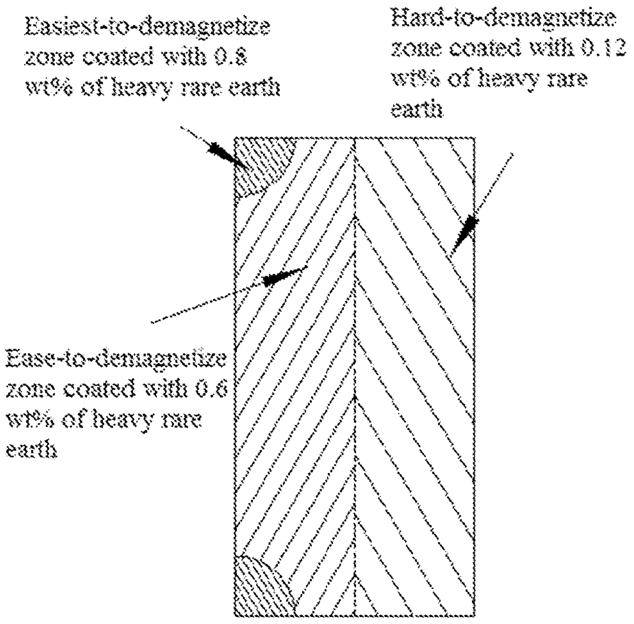
FIG. 1 is a schematic drawing illustrating the performance distribution of the neodymium-iron-boron magnetic body having gradient distribution according to the present disclosure.

For further understanding of the present disclosure, preferred embodiments of the present disclosure will be described below in conjunction with examples. However, it should be understood that these descriptions are only for further illustrating the features and advantages of the present disclosure, rather than limiting the claims of the present disclosure.

In the existing technology, it is difficult to keep a balance between remanence and coercivity, that is, if the remanence is very high, the coercivity will be relatively low. If the center part of the magnetic body has not been infiltrated with heavy rare earth, the coercivity will be relatively low, and the prepared magnetic body will has an abnormally low surface magnetic field in its center part, and it will attenuate before application, which will affect the application of the magnetic body. Therefore, the center part of the magnetic body must ensure a certain coercivity so as to avoid the weak magnetic phenomenon in the center part, but ensuring coercivity of the center part of the body will limit the increase of the remanence of the magnetic body. Therefore, the coercivity and remanence of the center part of the magnetic body need to be balanced, so as to ensure that the magnetic body does not show weak magnetic phenomenon in the center part and can ensure the increase of the magnetic body. Therefore, in view of the problem of unbalanced coercivity and remanence in the existing technology, the present application provides a neodymium-iron-boron magnetic body having gradient distribution, which makes the remanence, coercivity, magnetic flux and centersurface magnetic field of the neodymium-iron-boron magnetic body reach a balance and reduces the use of heavy rare earth elements by optimizing the coercivity of the hard-to-demagnetize zone. Specifically, an embodiment of the present disclosure discloses a neodymium-iron-boron magnetic body having gradient distribution, comprising an ease-to-demagnetize zone and a hard-to-demagnetize zone, wherein in a direction perpendicular to magnetization direction, remanence of the ease-to-demagnetize zone is less than remanence of the hard-to-demagnetize zone, and coercivity of the ease-to-demagnetize zone is greater than coercivity of the hard-to-demagnetize zone; and along the direction perpendicular to magnetization direction, the remanence and the coercivity of the ease-to-demagnetize zone are respectively a constant value, and the remanence and the coercivity of the hard-to-demagnetize zone are respectively a constant value.

The neodymium-iron-boron magnetic body according to this application further comprises an easiest-to-demagnetize zone, wherein in the direction perpendicular to magnetization direction, remanence of the easiest-to-demagnetize zone is less than the remanence of the ease-to-demagnetize zone, and coercivity of the easiest-to-demagnetize zone is greater than the coercivity of the ease-to-demagnetize zone, and along the direction perpendicular to magnetization direction, the remanence and the coercivity of the easiest-to-demagnetize zone are respectively a constant value.

In the neodymium-iron-boron magnetic body, due to the problem raised by the characteristics of each of the easiest-to-demagnetize zone, the ease-to-demagnetize zone and the hard-to-demagnetize, the coercivity of each of zones needs to match with each other, so as to ensure the coercivity and no occurrence of attenuation of surface magnetic field and magnetic flux, and to ensure the remanence of the ease-to-demagnetize zone and the easiest-to-demagnetize zone at the same time. Thus, in this application, the remanence of the ease-to-demagnetize zone is decreased by 0.05 KGs-0.4 KGs relative to the remanence of the hard-to-demagnetize zone, and the coercivity of the ease-to-demagnetize zone is increased by 2 KOe-10 KOe relative to the coercivity of the hard-to-demagnetize zone.

Similarly, the remanence of the easiest-to-demagnetize zone is decreased by 0.05 KGs-0.4 KGs relative to the remanence of the ease-to-demagnetize zone, and the coercivity of the easiest-to-demagnetize zone is increased by 2 KOe-10 KOe relative to the coercivity of the ease-to-demagnetize zone.

In the neodymium-iron-boron magnetic body having gradient distribution, along the direction perpendicular to magnetization direction, the coercivity achieved in the hard-to-demagnetize zone is matched with the coercivity achieved in the ease-to-demagnetize zone, to reach a balance between the remanence and the coercivity, and further to ensure the surface magnetic field and the magnetic flux.

In this application, there is a transition zone between the ease-to-demagnetize zone and the hard-to-demagnetize zone, and between the easiest-to-demagnetize zone and the ease-to-demagnetize zone, but this transition zone is so extremely narrow that it almost not affect its performance, and thus can be ignored.

This application further provides a preparation method of the neodymium-iron-boron magnetic body having gradient distribution, comprising the following steps:

A) in a direction perpendicular to magnetization direction, coating a first mixture containing a heavy rare earth powder and a solvent on a surface of the ease-to-demagnetize zone in the neodymium-iron-boron magnetic body, and coating a second mixture containing a heavy rare earth powder and a solvent on a surface of the hard-to-demagnetize zone in the neodymium-iron-boron magnetic body, with a mass of the heavy rare earth powder in the first mixture being higher than a mass of the heavy rare earth powder in the second mixture; and B) subjecting a neodymium-iron-boron magnetic body material obtained by step A) to a grain boundary diffusion treatment, and then to an aging treatment after being cooled, to obtain a neodymium-iron-boron magnetic body having gradient distribution.

For some neodymium-iron-boron magnetic bodies with special performance requirements, in step A), the method further comprises coating a third mixture containing a heavy rare earth powder and a solvent on a surface of the easiest-to-demagnetize zone in the neodymium-iron-boron magnetic body, with a mass of the heavy rare earth powder in the third mixture being greater than the mass of the heavy rare earth powder in the first mixture.

In view of performance requirements, the core idea of this application is specifically as shown in FIG. 1. FIG. 1 includes a hard-to-demagnetize zone, an ease-to-demagnetize zone and an easiest-to-demagnetize zone. The hard-to-demagnetize zone is subjected to a trace heavy rare earth diffusion, to ensure no attenuation of the surface magnetic field and the magnetic flux at room temperature or high temperature. The ease-to-demagnetize zone is subjected to a moderate trace heavy rare earth diffusion, to ensure that it will not be demagnetized by the demagnetizing field at high temperature to avoid the problem of magnetic flux attenuation. The easiest-to-demagnetize zone uses the largest amount of heavy rare earth or secondary infiltration, to maximally increase the coercivity of this zone. In the preparation of a high-performance magnetic body, in order to maximally increase the remanence, the base material before diffusion can be made to have a relatively low coercivity, and the hard-to-demagnetize zone is infiltrated with a small amount of heavy rare earth, the ease-to-demagnetize zone is infiltrated with more amount of heavy rare earth, and the easiest-to-demagnetize zone is infiltrated with a large amount of heavy rare earth or infiltrated for twice, so as to form a gradient distribution of coercivity including a low coercivity in the hard-to-demagnetize zone, a higher coercivity in the ease-to-demagnetize zone, and a highest coercivity in the easiest-to-demagnetize zone, which enable the magnetic body to have a high magnetic flux and high temperature resistance.

In order to realize the gradient distribution of coercivity of the neodymium-iron-boron magnetic body, the balance among magnetic flux, surface magnetic field and remanence, as well as to reduce the use of heavy rare earth elements, the mass of the heavy rare earth powder in the third mixture is provided as 0.6-1.2 wt % of a mass of the easiest-to-demagnetize zone in the neodymium-iron-boron magnetic body, the mass of the heavy rare earth powder in the first mixture is provided as 0.4-0.7 wt % of a mass of the ease-to-demagnetize zone in the neodymium-iron-boron magnetic body, and the mass of the heavy rare earth powder in the second mixture is provided as 0.05-0.3 wt % of the hard-to-demagnetize zone in the neodymium-iron-boron magnetic body. In this application, the neodymium-iron-boron magnetic body is a neodymium-iron-boron magnetic body well known to those skilled in the art, whose composition is not particularly limited.

In this application, the heavy rare earth powder in the first mixture, the second mixture and the third mixture are all heavy rare earth commonly used by those skilled in the art. In specific embodiments, they may be one or two selected from Tb and Dy, or may be fluoride of Tb and Dy as well as their alloy compounds. In order to facilitate the diffusion of heavy rare earth, the heavy rare earth is provided with a mean particle size of 1-100 μm. The solvent in the first mixture, the second mixture and the third mixture is selected from silicone oils, to realize the dissolution of the heavy rare earth powder, and also facilitate the volatilization of the solvent during the later diffusion process. More specifically, the heavy rare earth powder and the solvent are provided with a mass ratio of (90-98):(2-10), and 95:5 in specific embodiments.

In this application, the resulted neodymium-iron-boron magnetic body material is then subjected to the grain boundary diffusion, and to the aging treatment after being cooled, to obtain a neodymium-iron-boron magnetic body having gradient distribution. The grain boundary diffusion is specifically performed by: firstly maintaining the neodymium-iron-boron magnetic body material at a temperature of 300-500° C. for 3-5 h to volatilize the solvent in the mixture, and then heating at a temperature of 700-1000° C. to perform diffusion for 1-100 h. The aging treatment is performed at a temperature of 400-600° C. for 1-10 h.

In the field of sintered neodymium-iron-boron, using the grain boundary diffusion process enables heavy rare earth elements Dy, and Tb to maximally increase the coercivity, while the decrease of remanence is within 100-300 Gauss, which is much better than adding them in the formulation. Therefore, it is common in this field to use more than 0.5% of heavy rare earth by weight to ensure the maximum increase of HCj, without caring about the reduction of remanence. However, the present disclosure proposes to subject the hard-to-demagnetize zone to a grain boundary diffusion using a trace amount of heavy rare earth, with a diffusion amount within the range of 0.05%-0.3%, to preferentially ensuring that the remanence does not decrease, which can reduce the increase in HCj. In addition, the present disclosure proposes the concept of matching performance gradients, that is, matching two or more performance gradients with each other. If one of the gradients is too low in one aspect, the overall performance will also be affected. In a base material with high remanence but low coercivity, if the coercivity in the center gradient is too low, the weak magnetic phenomenon will occur, finally resulting in very low surface magnetic field and magnetic flux of the entire magnetic body. The trace diffusion and the match of performance gradients are combined. The trace diffusion is performed in the hard-to-demagnetize zone to ensure no decrease of remanence in this zone, and its coercivity is matched with the coercivity in the ease-to-demagnetize zone, which will not only reduce the decrease of remanence caused by uniformly coating the two infiltration surfaces, but also ensure that the coercivity in the center gradient to be not too low, avoiding the weak magnetic phenomenon in the center part, or the attenuation of magnetic properties in the center part under high temperature conditions, thereby preparing high-performance sintered neodymium-iron-boron magnetic body. In the actual use of sintered neodymium-iron-boron, when two zones have a coercivity difference more than 10 KOe, they are actually unmatched, and the high-performance zone is dragged down by the low-performance zone and cannot be fully utilized during use.

In order to further understand the present disclosure, the method for preparing the neodymium-iron-boron magnetic body having gradient distribution provided by the present disclosure will be described in detail below with reference to examples, but the protection scope of the present disclosure is not limited by the following examples.

Example 1

Terbium metal powder with an mean particle size of 3-4 microns was prepared, and poured into the silicone oil in a nitrogen-protected glove box, with a weight ratio of terbium powder and silicone oil being 95:5, and then the mixture was stirred well for use.

10 pieces of N54-type blanks were taken to test their performance, as shown in Table 4.

TABLE 1

Table showing the magnetic performance data of the N54-type blanks

| sample type | Br (KGs) | HCb (KOe) | HCJ (KOe) | Hk/HCj | BH(MAX) (MGsOe) |
|---|---|---|---|---|---|
| performance of the blank | 14.58 | 13.55 | 13.80 | 0.98 | 51.59 |

Each blank was cut into a square slice with a size of 40×20×1.8 (mm). A total of 180 slices of samples were made and divided into 3 groups.

Group 1: Using a specified coating equipment, on the two surfaces of 40×20 (mm), the prepared mixture of metal terbium powder and silicone oil were uniformly coated on its entire surfaces, with terbium in the samples of Group 1 used in an amount of 0.6% by weight of the samples. The resulted slice was taken as comparative sample 1.

Group 2: Using a specified coating equipment, except for an area of 30×12 (mm) in the center parts, the prepared mixture of metal terbium powder and silicone oil were uniformly coated on the remaining parts of the two surfaces of 40×20 (mm), with terbium used in the same amount with that used at the same position of the samples in Group 1, and with terbium in the samples of Group 2 used in an amount of 0.33% by weight of the samples. The resulted slice was taken as comparative sample 2.

Figure 2:
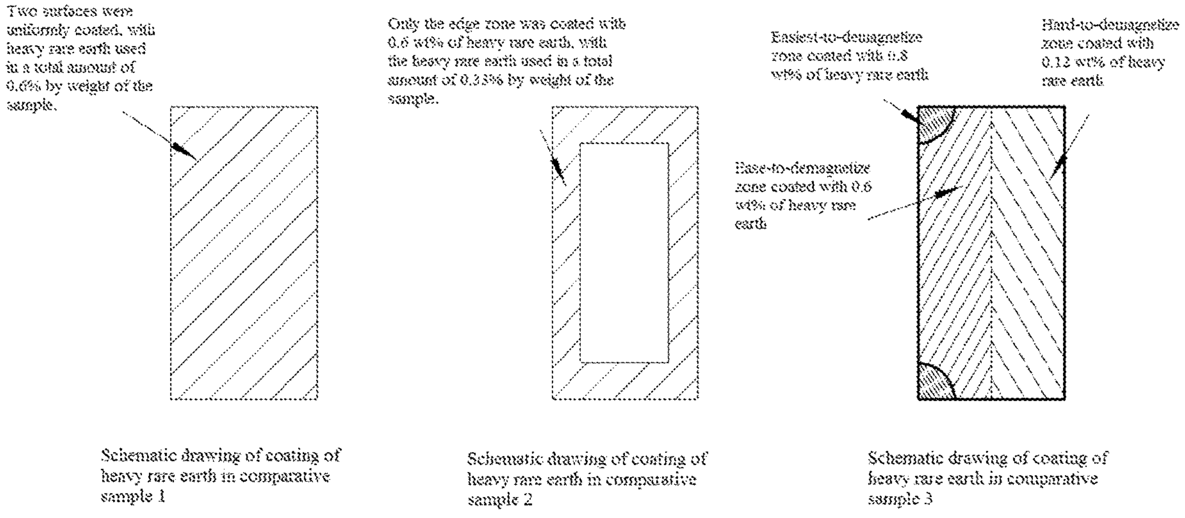
FIG. 2 is a schematic drawing illustrating the comparison among the different coating parts of different samples according to Example 1 of the present disclosure.

Group 3: As shown in FIG. 2, the 40×20 (mm) surface was divided into two zones with a size of 40×10 (mm) each, wherein the 40×10 (mm) zone on the side close to the coil in assembly of an electric motor was an ease-to-demagnetize zone in which the two R5 (mm) edge zones therein were easiest-to-demagnetize zones, and the 40×10 (mm) zone on the other side away from the coil was a hard-to-demagnetize zone.

Using a specified coating equipment, the prepared mixture of metal terbium powder and silicone oil was coated on the two R5 (mm) easiest-to-demagnetize zones with terbium infiltrated in an amount of 0.8% by mass of the easiest-to-demagnetize zones in the sintered neodymium-iron-boron magnetic body, and on the rest of the ease-to-demagnetize zone of the 40×10 (mm) with terbium used in an amount of 0.6% by mass of the ease-to-demagnetize zone in the sintered neodymium-iron-boron magnetic body, and on the hard-to-demagnetize zone of the 40×10 (mm) with terbium used in an amount of 0.12% by mass of the hard-to-demagnetize zone of the sintered neodymium-iron-boron magnetic body. Terbium in the samples of Group 3 was used in an amount of 0.37% by weight of the samples. The resulted slice was taken as sample 3, as specifically shown in 2.

Then, the coated samples of Group 1, Group 2 and Group 3 were placed at a vacuum diffusion furnace respectively. Firstly, they were maintained at a temperature of 400° C. for 4 hours to dry and remove silicone oil from the diffusion furnace through the vacuum system of the vacuum furnace. Then, they were heated to 700-1000° C. for the grain boundary diffusion treatment with a diffusion time of 30 hours. After the completion of the diffusion treatment, they were rapidly cooled to below 80° C. and then heated up to 500° C. for the aging treatment, with an aging time of 5 hours. After the completion of the aging treatment, they were rapidly cooled to below 80° C. followed by being taken out from the furnace, to obtain the processed samples of the 3 groups.

The 3 groups of the samples were tested on their performance. The magnetic flux and demagnetization resistance of the electric motor of the 3 groups of the magnetic bodies above were tested in accordance with the conventional technical means in this field. The results are shown in Table 2 and Table 3.

TABLE 2

Table showing magnetic performance data of the 3 groups of samples

| sample type | amount of Tb (%) | Br (KGs) | HCb (KOe) | HCJ (KOe) | Hk/HCj | BH(MAX) (MGsOe) |
|---|---|---|---|---|---|---|
| comparative sample 1 | 0.6 | 14.24 | 13.73 | 24.79 | 0.98 | 49.32 |
| center part of comparative sample 2 | 0 | 14.58 | 13.55 | 13.80 | 0.98 | 51.59 |
| edge of comparative sample 2 | 0.6 | 14.24 | 13.74 | 24.70 | 0.98 | 49.30 |
| hard-to-demagnetize zone of sample 3 | 0.12 | 14.51 | 14.00 | 18.50 | 0.98 | 51.01 |
| ease-to-demagnetize zone of sample 3 | 0.6 | 14.25 | 13.75 | 24.77 | 0.98 | 49.35 |
| easiest-to-demagnetize zone of sample 3 | 0.80 | 14.20 | 13.92 | 26.82 | 0.98 | 49.14 |

TABLE 3

Table showing the data of magnetic flux and electric motor resistance to demagnetization of the 3 groups of samples

| sample type | amount of Tb (%) | magnetic flux (μWB) | electric motor demagnetization rate (%) at 130° C./32 A | electric motor demagnetization rate (%) at 130° C./65 A |
|---|---|---|---|---|
| comparative sample 1 | 0.6 | 217 | 2.50% | 6.02% |
| comparative sample 2 | 0.33 | 222 | 10.26% | 41.67% |
| sample 3 | 0.37 | 224 | 0.98% | 1.78% |

From Table 2 and Table 3, it can be seen that in comparative sample 2, because the base material had a coercivity up to 13.80 KOe, the magnetic flux was not low, even without any diffusion treatment for the center. However, the high-temperature demagnetization field test of the sample assembled into an electric motor shows that, due to a low Hcj in the center part, the attenuations were very large, which were 10.26% and 41.67% respectively, lower than sample 1 and sample 3. In sample 3, by using trace diffusion of heavy rare earth in the hardly demagnetized zone to ensure no decrease of the remanence in the hardly demagnetized zone, thereby increasing the magnetic flux. The magnetic flux of sample 3 was 3.22% higher than that of comparative sample 1.

The magnetic body of sample 3 was divided into three zones, namely, a most easily demagnetized zone, an easily demagnetized zone, and a hardly demagnetized zone, with Hcj gradient difference among them being between 2 and 10 kOe. In sample 3, by using a process of increasing the infiltration amount in the easiest-to-demagnetize zone, Hcj of the easiest-to-demagnetize zone reached to 26.82 kOe, thereby greatly improving the anti-demagnetization ability. In comparative sample 2, the demagnetization deteriorated sharply under high current, but the electric motor demagnetization rate of sample 3 at 130° C. and high current of 65 A was merely 1.78%, which was much better than that of comparative sample 2. Although the amount of terbium used in sample 3 was only 62% of that in comparative sample 1, its overall performance was the best. This demonstrates that by gradient design of composition and structure, the infiltration amount of heavy rare earth can be reduced, and the product performance can be improved.

Example 2

Terbium metal powder with an mean particle size of 3-4 microns was prepared, and poured into the silicone oil in a nitrogen-protected glove box, with a weight ratio of terbium powder and silicone oil being 95:5, and then the mixture was stirred well for use.

5 pieces of N56-type blanks were taken to test their performance, as shown in Table 4.

TABLE 4

Table showing the magnetic performance data of the N56-type blanks

| sample type | Br (KGs) | HCb (KOe) | HCJ (KOe) | Hk/HCj | BH (MAX) (MGsOe) |
|---|---|---|---|---|---|
| performance of the blank | 15.11 | 10.72 | 11.28 | 0.97 | 54.71 |

Each blank was cut into a square slice with a size of 40×20×1.8 (mm). A total of 90 slices of samples were made and divided into 3 groups.

Group 1: Using a specified coating equipment, on the two surfaces of 40×20 (mm), the prepared mixture of metal terbium powder and silicone oil were uniformly coated on in its entire surfaces, with terbium used in an amount of 0.6% by weight of the samples. The resulted sample was taken as comparative sample 1.

Group 2: Using a specified coating equipment, except for an area of 30×12 (mm) in the center parts, the prepared mixture of metal terbium powder and silicone oil were uniformly coated on the remaining parts of the two surfaces of 40×20 (mm), with terbium used in the same amount with that used at the same position of the samples in Group 1, with terbium in the samples of Group 2 used in an amount of 55% of that in Group 1, and with terbium used in an amount of 0.33% by weight of the samples. The resulted sample was taken as comparative sample 2.

Figure 3:
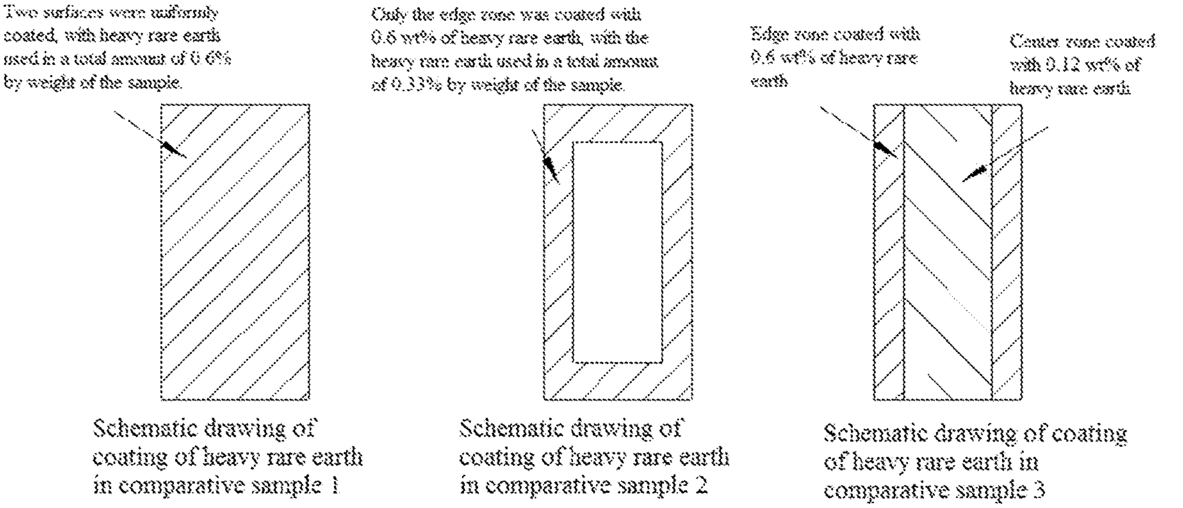
FIG. 3 is a schematic drawing illustrating the comparison among the different coating parts of different samples according to Example 2 of the present disclosure.

Group 3: The 40×20 (mm) surface was divided into three parts, respectively with a size of 40×4 (mm), 40×12 (mm) and 40×4 (mm), of which two sides of the 40×4 (mm) zones were ease-to-demagnetize zones, and the middle zone was a hard-to-demagnetize zone, as shown in FIG. 3. This product is symmetrical on both sides, which can avoid the ease-to-demagnetize zones and the hard-to-demagnetize zone to be installed reversely in assembly of a magnetic body.

Using a specified coating equipment, the prepared mixture of metal terbium powder and silicone oil was slightly coated on the center part, with an area of 40×12 (mm), of the two surface of the 40×20 (mm), with terbium used in an amount of 0.12% by mass of the hard-to-demagnetize zone in the neodymium-iron-boron magnetic body. In the other two zones, terbium was used in an amount of 0.6% by mass of the ease-to-demagnetize zones in the neodymium-iron-boron magnetic body. Terbium used in the samples of Group 3 was in an amount of 52% of that in Group 1, and in an amount of 0.312% by weight of the samples. The resulted slice was taken as sample 3, as specifically shown in FIG. 3.

Then, the coated samples of Group 1, Group 2 and Group 3 were placed in a vacuum diffusion furnace respectively. They were maintained at a temperature of 400° C. for 4 hours to dry and remove silicone oil from the diffusion furnace through the vacuum system of the vacuum furnace. They were then heated to 700-1000° C. for the grain boundary diffusion treatment with a diffusion time of 30 hours. After the completion of the diffusion treatment, they were rapidly cooled to below 80° C., and then heated up to 500° C. for the aging treatment, with an aging time of 5 hours. After the completion of the aging treatment, they were rapidly cooled to below 80° C. followed by being taken out from the furnace, to obtain the processed samples of the 3 groups.

The 3 groups of the samples were tested on their performance. The magnetic flux and demagnetization resistance of the electric motor of the 3 groups of the magnetic bodies above were tested in accordance with the conventional technical means in this field. The results are shown in Table 5 and Table 6.

TABLE 5

Table showing magnetic performance data of the 3 groups of samples

| sample type | amount of Tb (%) | Br (KGs) | HCb (KOe) | HCJ (KOe) | Hk/HCj | BH(MAX) (MGsOe) |
|---|---|---|---|---|---|---|
| comparative sample 1 | 0.6 | 14.85 | 14.30 | 23.51 | 0.97 | 52.95 |
| center part of comparative sample 2 | 0 | 15.08 | 10.70 | 11.32 | 0.97 | 54.57 |
| edge of comparative sample 2 | 0.6 | 14.80 | 14.25 | 23.44 | 0.98 | 52.71 |
| center part of sample 3 | 0.12 | 15.06 | 14.28 | 18.34 | 0.97 | 54.46 |
| edge of sample 3 | 0.6 | 14.83 | 14.29 | 23.54 | 0.98 | 52.78 |

TABLE 6

Table showing data of magnetic flux, center surface magnetic field, demagnetization resistance of the electric motor of the 3 groups of samples

| sample type | amount of Tb (%) | magnetic flux (μWB) | center surface magnetic field (mT) | electric motor demagnetization rate (%) at 130° C./30 A | electric motor demagnetization rate (%) at 130° C./30 A |
|---|---|---|---|---|---|
| comparative sample 1 | 0.6 | 224 | 145 | 2.70% | 5.05% |

TABLE 6-continued

Table showing data of magnetic flux, center surface magnetic field, demagnetization resistance of the electric motor of the 3 groups of samples

| sample type | amount of Tb (%) | magnetic flux (μWB) | center surface magnetic field (mT) | electric motor demagnetization rate (%) at 130° C./30 A | electric motor demagnetization rate (%) at 130° C./30 A |
|---|---|---|---|---|---|
| comparative sample 2 | 0.33 | 189 | 88 | 14.75% | 35.43% |
| sample 3 | 0.312 | 229 | 148 | 2.98% | 5.31% |

From Table 5 and Table 6, it can be seen that the magnetic flux and center surface magnetic field of comparative sample 2 are significantly lower than that of comparative sample 1 and comparative sample 3, because comparative sample 2 has too low coercivity at the center where no diffusion treatment was performed. The PC value in the center part was the smallest, and a weak magnetic phenomenon was showed. The magnetic fluxes of comparative sample 1 and comparative sample 3 were more than 15% higher than that of comparative sample 2.

In comparative sample 1, the two surfaces were fully and uniformly coated, and the center surface magnetic field and magnetic flux were 2% lower than that of comparative sample 3. The grain boundary diffusion of heavy rare earth into the sintered neodymium-iron-boron can increase the coercivity, but at the same time it will also reduce the remanence. The center part of sample 3 adopted a process of trace diffusion of heavy rare earth to ensure no decrease of the remanence in the center part. Although the increased coercivity was not as much as that in the edges, the increased coercivity in the center part can ensure no occurrence of weak magnetic phenomenon in the center part.

In comparative sample 2, because the center part was treated with the diffusion treatment, it demagnetized firstly, and the demagnetization resistance of the electric motor was extremely bad. The demagnetization resistance of the electric motor of sample 3 was close to that of comparative sample 1 whose two surface were fully and uniformly coated, and significantly better than that of comparative sample 2, but the amount of heavy rare earth used in sample 3 was only 52% of sample 1. By gradient design of composition and structure, sample 3 reduced infiltration amount of heavy rare earth, while keeping the demagnetization resistance of the electric motor almost unchanged.

Example 3

10 pieces of 48H-type blanks were taken to test their performance, as shown in Table 7.

TABLE 7

Table showing the magnetic performance data of the 48H-type blanks

| sample type | Br (KGs) | HCb (KOe) | HCJ (KOe) | Hk/HCj | BH(MAX) (MGsOe) |
|---|---|---|---|---|---|
| performance of the blank | 13.89 | 13.36 | 18.69 | 0.98 | 46.28 |

Each blank was cut into a square slice with a size of 40×20×1.8 (mm). A total of 100 slices of samples were made and divided into 2 groups.

Group 1: The magnetic body with a size of 40×20×1.8 (mm), was placed in an argon-protected chamber vertically in the magnetization direction, and uniformly coated with the prepared terbium metal powder on the entire 40×20 surface, with the terbium powder being 0.5% by weight of the magnetic body. The magnetic body coated with the terbium powder layer was then moved under a laser, and the laser is used to irradiate the zone within 3 mm from the edge of the magnetic body slice surface (the irradiated area accounted for about 40.5% of the area covered by the terbium rare earth powder), so that the terbium powder in this zone is rapidly heated and solidified into a heavy rare earth film layer and adhered to the surface of the magnetic body slice. After cleaning the unfilmed terbium rare earth powder on the surface of the magnetic body slice, the magnetic body slice was turned over, and the above steps were repeated on the other surface of the magnetic body slice, and then the magnetic body was placed into a vacuum diffusion furnace for aging treatment. After the diffusion treatment, a gradient neodymium-iron-boron magnetic body was formed. On the surface perpendicular to the magnetization direction, it was divided into three zones, namely, an edge zone, a transition zone and a center zone. The edge zone had a mean Hcj greater than that of the transition zone, accounted for 40.5% of the area, and had a mean Tb content of 0.5 wt %. The transition zone had a mean Hcj greater than the center zone, accounted for 22% of the area, and had a mean Tb content of 0.3 wt %. The center zone accounted for 37.5% of the area, and had a mean Tb content of 0. In sum, the amount of terbium used in the samples of Group 1 was 0.2685% by weight of the samples. The resulted slice was taken as comparative sample 1.

Figure 4:
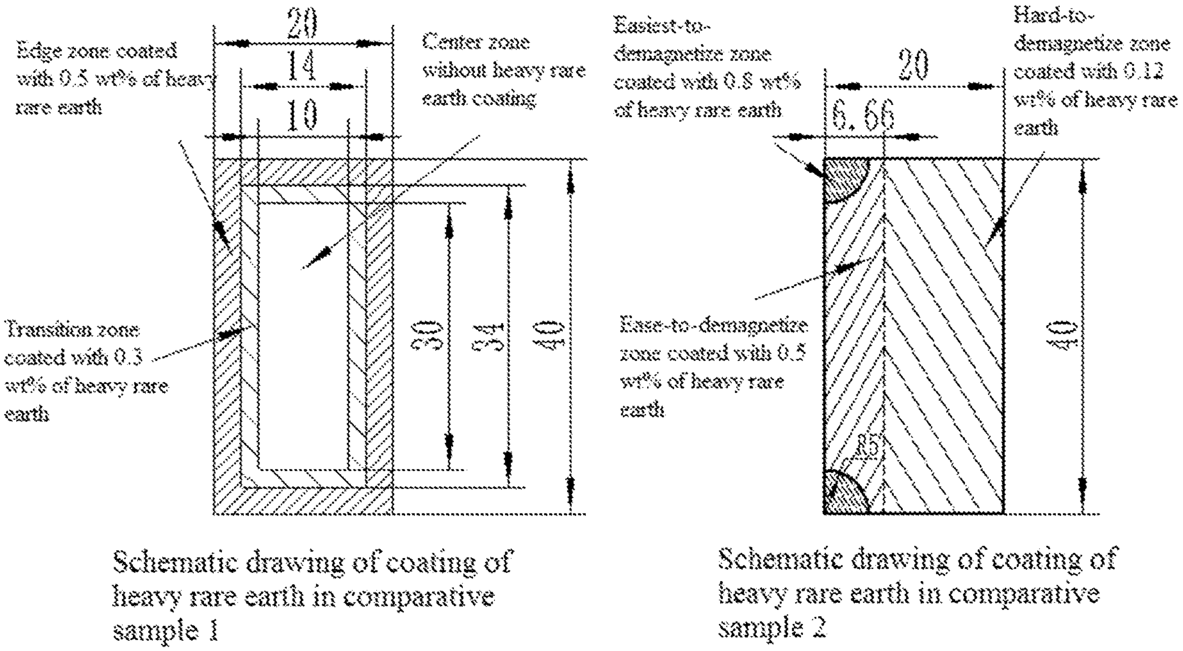
FIG. 4 is a schematic drawing illustrating the comparison among the different coating parts of different samples according to Example 3 of the present disclosure.

Group 2: As shown in FIG. 4, at the 40×20 (mm) surface, the 40×6.67 (mm) zone on the side close to the coil in assembly of an electric motor was an ease-to-demagnetize zone in which the two R5 (mm) edge zones therein were easiest-to-demagnetize zones, and the 40×13.34 (mm) zone on the other side away from the coil was a hard-to-demagnetize zone.

Using a specified coating equipment, the prepared mixture of metal terbium powder and silicone oil was infiltrated on the two R5 (mm) easiest-to-demagnetize zones, with terbium used in an amount of 0.8% by mass of the easiest-to-demagnetize zones, and on the 40×6.66 (mm) ease-to-demagnetize zone, with terbium used in an amount of 0.5% by mass of the ease-to-demagnetize zone, and on the 40×13.33 (mm) hard-to-demagnetize zone with terbium used in an amount of 0.12% by mass of the hard-to-demagnetize zone. In sum, the amount of terbium used in the samples of Group 3 was 0.2614% by weight of the samples. The resulted slice was taken as sample 2, as specifically shown in FIG. 4.

The coated samples of Group 1 and Group 2 were then placed in a vacuum diffusion furnace respectively. They were heated to 700-1000° C. for the grain boundary diffusion treatment with a diffusion time of 30 hours. After the completion of the diffusion treatment, they were rapidly cooled to below 80° C., and then heated up to 500° C. for the aging treatment, with an aging time of 5 hours. After the completion of the aging treatment, they were rapidly cooled to below 80° C. followed by being taken out from the furnace, to obtain the processed samples of the 2 groups.

The 2 groups of the samples were tested on their performance. The magnetic flux and demagnetization resistance of the electric motor of the magnetic bodies of the 2 groups above were tested in accordance with the conventional technical means in this field. The results are shown in Table 8 and Table 9.

TABLE 8

Table showing magnetic performance data of the 2 groups of samples

| sample type | amount of Tb (%) | Br (KGs) | HCb (KOe) | HCJ (KOe) | Hk/HCj | BH(MAX) (MGsOe) |
|---|---|---|---|---|---|---|
| center zone of comparative sample 1 | 0 | 13.89 | 13.36 | 18.69 | 0.98 | 46.28 |
| transition zone of comparative sample 1 | 0.3% | 13.77 | 13.29 | 24.78 | 0.98 | 45.94 |
| edge zone of comparative sample 1 | 0.5% | 13.73 | 13.25 | 27.62 | 0.98 | 45.59 |
| hard-to-demagnetize zone of sample 2 | 0.12% | 13.86 | 13.33 | 24.52 | 0.98 | 46.20 |
| ease-to-demagnetize zone of sample 2 | 0.5% | 13.74 | 13.26 | 27.81 | 0.98 | 45.63 |
| easiest-to-demagnetize zone of sample 2 | 0.80% | 13.68 | 13.20 | 30.05 | 0.98 | 45.19 |

TABLE 9

Table showing data of magnetic flux and demagnetization resistance of the electric motor of the 2 groups of samples

| sample type | amount of Tb (%) | magnetic flux (μWB) | electric motor demagnetization rate (%) at 150° C./32 A | electric motor demagnetization rate (%) at 150° C./65 A |
|---|---|---|---|---|
| comparative sample 1 | 0.2685% | 211 | 2.37% | 7.04% |
| comparative sample 2 | 0.2614% | 213 | 0.85% | 1.16% |

Form Table 8 and Table 9, it can be seen that in comparative sample 2 by performing trace diffusion on the hard-to-demagnetize zone, Br almost did not decrease, and magnetic flux was 1.0% higher than that of comparative sample 1. The high-temperature demagnetization field test of the sample assembled into an electric motor shows that, due to a low Hcj in the center part in comparative sample 1, the attenuations were very large, which were 2.37% and 7.04% at 150° C./32 A and 150° C./65 A, respectively. In sample 2, by adopting a process of increasing the infiltration amount in the easiest-to-demagnetize zone, Hcj in the easiest-to-demagnetize zone reached to 30.05 kOe, thereby greatly improving the anti-demagnetization ability. In comparative sample 1, the demagnetization rate deteriorated sharply under high current, but the electric motor demagnetization rate of comparative sample 2 at 130° C. and high current of 65 A was merely 1.16%, which was much better than that of comparative sample 1. Although the amount of terbium used in sample 2 was less than that of comparative sample 1, its performance was better than comparative sample 1.

Although the above sample 2 in Example 1, sample 2 in Example 2 and sample 1 in Example 3 were made by different preparation methods, the resulted final products had the same gradient distribution.

The description of the examples above is only used to facilitate understanding of the method and core concept of the present disclosure. It should be pointed out that it is possible for those skilled in the art to make various improvements and modifications without departing from the principle and scope of the present disclosure, and these improvements and modifications should also fall within the scope of protection of the present disclosure.

Based on the above description of the disclosed examples, those skilled in the art can implement or carry out the present disclosure. It is apparent for those skilled in the art to make many modifications to these examples. The general principle defined herein may be applied to other examples without departing from the spirit or scope of the present disclosure. Therefore, the present disclosure is not limited to the examples illustrated herein, but should conform to the widest scope consistent with the principle and novel features disclosed herein.

The invention claimed is:

1. A neodymium-iron-boron magnetic body having zones with different magnetic performance, comprising an ease-to-demagnetize zone and a hard-to-demagnetize zone, wherein in a direction perpendicular to magnetization direction, remanence of the ease-to-demagnetize zone is less than remanence of the hard-to-demagnetize zone, and coercivity of the ease-to-demagnetize zone is greater than coercivity of the hard-to-demagnetize zone; and along the direction perpendicular to magnetization direction, the remanence and the coercivity of the ease-to-demagnetize zone are respectively constant values, and the remanence and the coercivity of the hard-to-demagnetize zone are respectively constant values;

wherein in the direction perpendicular to magnetization direction, remanence of the easiest-to-demagnetize zone is less than the remanence of the ease-to-demagnetize zone, and coercivity of the easiest-to-demagnetize zone is greater than the coercivity of the ease-to-demagnetize zone, and along the direction perpendicular to magnetization direction, the remanence and the coercivity of the easiest-to-demagnetize zone are respectively constant values;

wherein the remanence of the ease-to-demagnetize zone decreases by 0.05 KGs-0.4 KGs relative to the remanence of the hard-to-demagnetize zone, and the coercivity of the ease-to-demagnetize zone increases by 2 KOe-10 KOe relative to the coercivity of the hard-to-demagnetize zone; and wherein the remanence of the easiest-to-demagnetize zone decreases by 0.05 KGs-0.4 KGs relative to the remanence of the ease-to-demagnetize zone, and the coercivity of the easiest-to-demagnetize zone increases by 2 KOe-10 KOe relative to the coercivity of the ease-to-demagnetize zone;

wherein the neodymium-iron-boron magnetic body is prepared by a method comprising the following steps:

A) in a direction perpendicular to magnetization direction, coating a first mixture containing a heavy rare earth powder and a solvent on a surface of the ease-to-demagnetize zone in the neodymium-iron-boron magnetic body, and coating a second mixture containing a heavy rare earth powder and a solvent on a surface of the hard-to-demagnetize zone in the neodymium-iron-boron magnetic body, with a mass of the heavy rare earth powder in the first mixture being higher than a mass of the heavy rare earth powder in the second mixture;

coating a third mixture containing a heavy rare earth powder and a solvent on a surface of the easiest-to-demagnetize zone in the neodymium-iron-boron magnetic body, with a mass of the heavy rare earth powder in the third mixture being greater than the mass of the heavy rare earth powder in the first mixture; and B) subjecting a neodymium-iron-boron magnetic body material obtained by step A) to a grain boundary diffusion treatment, and then to an aging treatment after being cooled, to obtain a neodymium-iron-boron magnetic body having zones with different magnetic performance;

wherein the mass of the heavy rare earth powder in the third mixture is 0.6-1.2 wt % of a mass of the easiest-to-demagnetize zone in the neodymium-iron-boron magnetic body, the mass of the heavy rare earth powder in the first mixture is 0.4-0.7 wt % of a mass of the ease-to-demagnetize zone in the neodymium-iron-boron magnetic body, and the mass of the heavy rare earth powder in the second mixture is 0.05-0.3 wt % of a mass of the hard-to-demagnetize zone in the neodymium-iron-boron magnetic body.

2. A preparation method of the neodymium-iron-boron magnetic body having zones with different magnetic performance according to claim 1, comprising the following steps:

A) in a direction perpendicular to magnetization direction, coating a first mixture containing a heavy rare earth powder and a solvent on a surface of the ease-to-demagnetize zone in the neodymium-iron-boron magnetic body, and coating a second mixture containing a heavy rare earth powder and a solvent on a surface of the hard-to-demagnetize zone in the neodymium-iron-boron magnetic body, with a mass of the heavy rare earth powder in the first mixture being higher than a mass of the heavy rare earth powder in the second mixture;

coating a third mixture containing a heavy rare earth powder and a solvent on a surface of the easiest-to-demagnetize zone in the neodymium-iron-boron magnetic body, with a mass of the heavy rare earth powder in the third mixture being greater than the mass of the heavy rare earth powder in the first mixture; and B) subjecting a neodymium-iron-boron magnetic body material obtained by step A) to a grain boundary diffusion treatment, and then to an aging treatment after being cooled, to obtain a neodymium-iron-boron magnetic body having zones with different magnetic performance;

wherein the mass of the heavy rare earth powder in the third mixture is 0.6-1.2 wt % of a mass of the easiest-to-demagnetize zone in the neodymium-iron-boron magnetic body, the mass of the heavy rare earth powder in the first mixture is 0.4-0.7 wt % of a mass of the ease-to-demagnetize zone in the neodymium-iron-boron magnetic body, and the mass of the heavy rare earth powder in the second mixture is 0.05-0.3 wt % of a mass of the hard-to-demagnetize zone in the neodymium-iron-boron magnetic body;

wherein the heavy rare earth powder in the first mixture, the heavy rare earth powder in the second mixture and the heavy rare earth powder in the third mixture are one or two independently selected from terbium powder, terbium fluoride powder, terbium alloy powder, dysprosium powder, dysprosium fluoride powder and dysprosium alloy powder, the heavy rare earth powder has a mean particle size of 1-100 μm;

the solvent in the first mixture, the solvent in the second mixture and the solvent in the third mixture are all silicone oil; and a mass ratio of the heavy rare earth powder to the solvent in the first mixture, a mass ratio of the heavy rare earth powder to the solvent in the second mixture, and a mass ratio of the heavy rare earth powder to the solvent in the third mixture are all (90-98):(2-10).

3. The preparation method according to claim 2, wherein the grain boundary diffusion treatment is specifically performed by:

firstly maintaining the neodymium-iron-boron magnetic body material at a temperature of 300-500° C. in a vacuum infiltration furnace for 3-5 h to dry and remove the silicone oil, and then heating at a temperature of 700-1000° C. and maintaining for 1-100 h.

4. The preparation method according to claim 2, wherein the aging treatment is performed at a temperature of 400-600° C. for 4-6 h.

* * * * *